R. J. EVANS.
RUBBER TIRE FOR VEHICLES.
APPLICATION FILED MAY 27, 1908.

949,888.

Patented Feb. 22, 1910.

Witnesses:

Inventor:
Richard J. Evans
by W. B. Corwin
Atty.

UNITED STATES PATENT OFFICE.

RICHARD J. EVANS, OF FRANKLIN, PENNSYLVANIA.

RUBBER TIRE FOR VEHICLES.

949,888.  Specification of Letters Patent. Patented Feb. 22, 1910.

Application filed May 27, 1908. Serial No. 435,232.

*To all whom it may concern:*

Be it known that I, RICHARD J. EVANS, a citizen of the United States, residing at Franklin, in the county of Venango and State of Pennsylvania, have invented a new and useful Improvement in Rubber Tires for Vehicles, of which the following is a specification.

My invention relates to rubber tires for vehicles and particularly to pneumatic tires therefor consisting of an inner air tube and an outer inclosing shoe or casing. Heretofore such tires or casings have ordinarily been provided with layers of canvas or ducking, preferably made of sea island cotton, incorporated with and embedded in the body of the rubber of the tire for the purpose of reinforcement and to some extent to resist puncture; but tires so constructed have been found to possess various objections and disadvantages owing to the natural tendency of the canvas or ducking to disintegrate or rot, which is aided in many cases by the injury to the cotton by the heat employed in the vulcanizing operation and by the access of water or moisture thereto when in use.

My invention is designed to obviate such objections and disadvantages, and consists in employing woven asbestos cloth or ducking in lieu of the vegetable ducking or canvas now employed for the purpose, such asbestos cloth being in some cases strengthened by running fine copper, brass, or other metallic wires through the interior of the strands composing the asbestos cloth or ducking.

Figure 1:
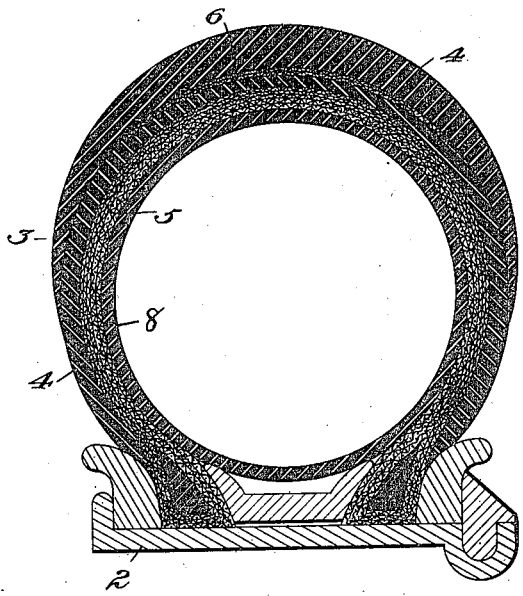
Figure 2:
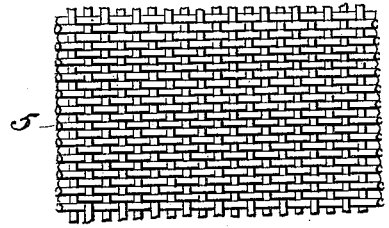
Figure 3:
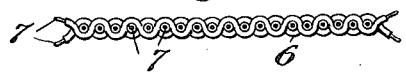

In the accompanying drawing, forming part of this specification, and in which similar symbols of reference indicate similar parts, Figure 1 represents in cross-section a tire provided with my invention; and Figs. 2 and 3 show enlarged fragmentary views of the asbestos cloth or ducking employed in the construction of the tire.

In the drawing, 2 represents an ordinary vehicle rim and 3 the tire shoe or casing held by the same. The shoe or casing 3 is composed of the ordinary vulcanized rubber body 4 having embedded therein and incorporated therewith superposed layers of woven asbestos cloth or ducking 5 forming a considerable portion of the thickness of the tire, and outside of the layers 5 and separated therefrom by a layer of rubber another layer or layers 6, preferably of less thickness than the portion 5, of similar woven asbestos cloth or ducking. The layer or layers 6 may be omitted if desired but they are generally used and their use is found desirable. 8 is the ordinary inner tube of a pneumatic tire.

The layers of woven asbestos cloth forming the portions 5 and 6, or either of said portions, may be reinforced and strengthened by fine copper or brass wires 7 running through the interior of each of the strands of the asbestos cloth, or through as many of said strands as may be found desirable.

My improved tire thus constructed will be found to have many advantages not possessed by the tires now in common use. It is very much stronger than a tire made with the ordinary cotton ducking or canvas; is much more durable as it will not rot as does the cotton cloth; is much more impervious so far as liability to puncture is concerned; and is not injured in the slightest in the vulcanizing operation as the heat necessary for such operation has no deleterious effect on the same, whereas the ordinary cotton ducking is very frequently damaged by such heat and its life seriously lessened.

I claim:—

1. A hollow tire composed of vulcanized rubber and superposed layers of woven asbestos cloth incorporated with the rubber during the vulcanizing operation.

2. A hollow tire composed of vulcanized rubber and superposed layers of woven asbestos cloth incorporated with the rubber during the vulcanizing operation, said asbestos cloth having metal wires extending through the interior of some of the strands thereof.

3. A shoe or casing for a pneumatic tire composed of vulcanized rubber and superposed layers of woven asbestos cloth embedded and incorporated with the inner portion of the body of the shoe during the vulcanizing operation.

4. A shoe or casing for a pneumatic tire composed of vulcanized rubber, superposed layers of woven asbestos cloth embedded and incorporated within the inner portion of the body of the shoe, and an outer layer or layers of woven asbestos cloth embedded in the outer portion of the body of the shoe and separated from said inner fabric portion by a layer of rubber.

5. A pneumatic tire composed of vulcanized rubber and superposed layers of woven asbestos cloth embedded and incorporated within the inner portion of the body of the tire during the vulcanizing operation, said asbestos cloth having metal wires extending through the interior of some of the strands thereof.

6. A pneumatic tire composed of vulcanized rubber, superposed layers of woven asbestos cloth embedded and incorporated within the inner portion of the body of the tire, and an outer layer or layers of woven asbestos cloth embedded in the rubber and separated from said inner layers by a layer of rubber, said asbestos cloth having metal wires extending through the interior of some of the strands thereof.

RICHARD J. EVANS.

Witnesses:
WM. A. MALLORY,
J. D. SELB.